(12) United States Patent
Santicchi

(10) Patent No.: US 7,404,480 B2
(45) Date of Patent: Jul. 29, 2008

(54) BELT WITH OPENINGS USED TO SUPPORT AND GUIDE GARMENTS IN OVERHEAD CONVEYOR SYSTEMS

(75) Inventor: Enrico Maria Santicchi, Perugia (IT)

(73) Assignee: Immobiliare Metalprogetti S.R.L., Perugia (IT)

( * ) Notice: Subject to any disclaimer, the term of this patent is extended or adjusted under 35 U.S.C. 154(b) by 299 days.

(21) Appl. No.: 10/575,004

(22) PCT Filed: Jan. 10, 2005

(86) PCT No.: PCT/IT2005/000006
§ 371 (c)(1),
(2), (4) Date: Apr. 6, 2006

(87) PCT Pub. No.: WO2005/070794
PCT Pub. Date: Aug. 4, 2005

(65) Prior Publication Data
US 2008/0053795 A1   Mar. 6, 2008

(30) Foreign Application Priority Data
Jan. 22, 2004   (IT) .................. MC2004A0009

(51) Int. Cl.
*B65G 47/61*   (2006.01)
(52) U.S. Cl. .................. 198/465.4; 198/687; 198/678.1
(58) Field of Classification Search ............ 198/465.4, 198/678.1, 686, 687
See application file for complete search history.

(56) References Cited

U.S. PATENT DOCUMENTS

| | | | | | |
|---|---|---|---|---|---|
| 2,732,929 | A | * | 1/1956 | Delaney ................... | 198/686 |
| 3,139,175 | A | * | 6/1964 | Wells ...................... | 198/686 |
| 3,598,228 | A | * | 8/1971 | Pipes ...................... | 198/687 |
| 3,627,595 | A | * | 12/1971 | Leach ...................... | 198/683 |
| 5,072,827 | A | * | 12/1991 | Santicchi ................. | 198/678.1 |
| 5,839,371 | A | * | 11/1998 | Knuttel ................... | 104/172.4 |
| 5,857,556 | A | * | 1/1999 | Bonacorsi ................ | 198/683 |
| 6,244,425 | B1 | * | 6/2001 | Volker et al. ............. | 198/686 |

* cited by examiner

*Primary Examiner*—Mark A Deuble
(74) *Attorney, Agent, or Firm*—Leonard Bloom; Robert M. Gamson; Ruth F. Vadi

(57) ABSTRACT

The present invention refers to a belt for overhead conveyor systems, of the type provided with regularly spaced openings (F), characterised by the fact that it has a close series of brackets (1) fixed to the upper longitudinal edge of the belt, each bracket being composed by an opposite pair of identical curved jaws (2, 3) and designed to support an opposite pair of wheels (10) with horizontal axis in central position and a single wheel with vertical axis at each end; it being provided that the wheels (8) allow the belt to remain coupled and slide inside a boxed rail that is the bearing structure of the overhead conveyor system.

9 Claims, 5 Drawing Sheets

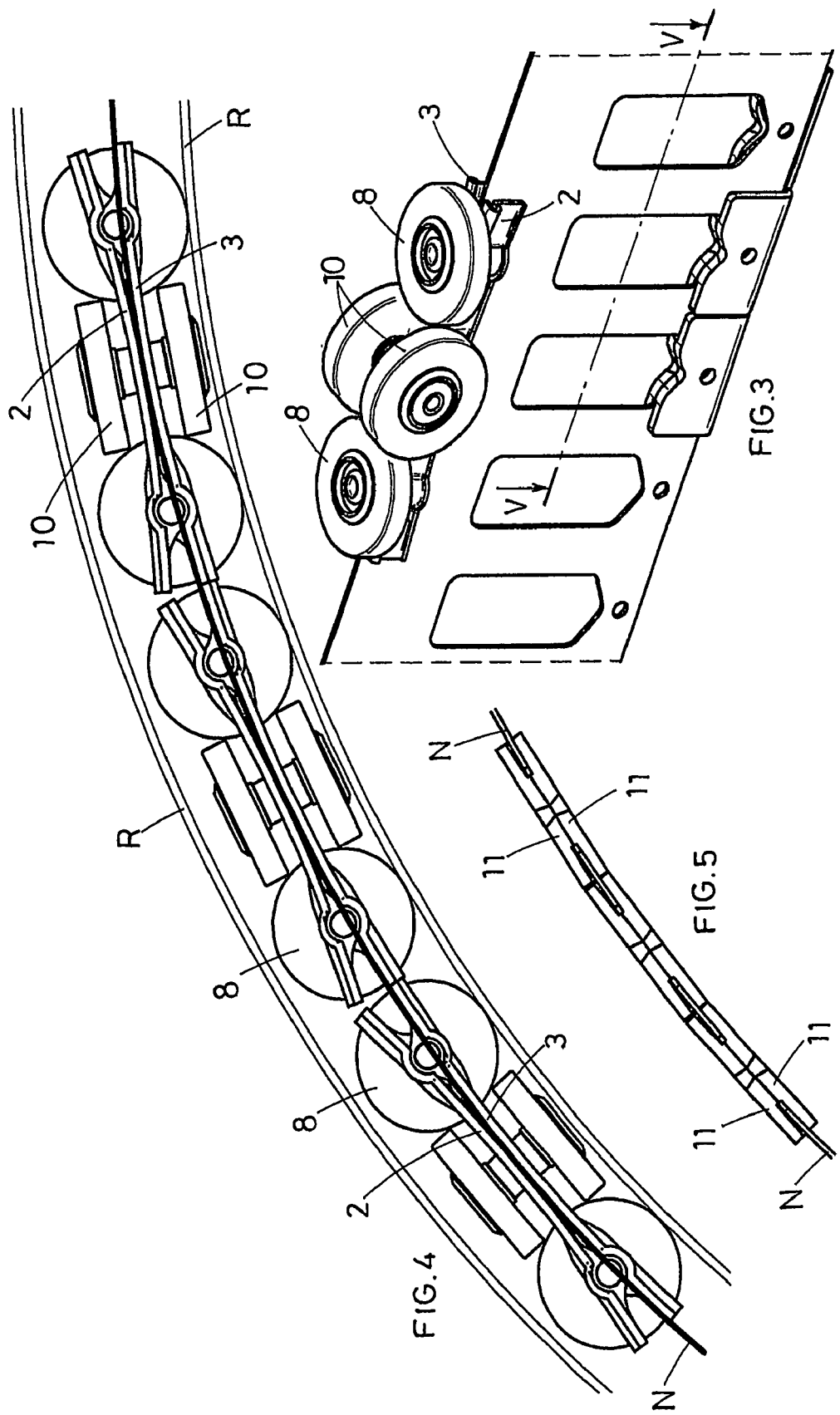

BELT WITH OPENINGS USED TO SUPPORT AND GUIDE GARMENTS IN OVERHEAD CONVEYOR SYSTEMS

The present patent application refers to a belt with openings used to guide and support garments in overhead conveyor systems.

The Applicant has been operating for many years in the production of overhead conveyor systems used to move and sort out garments, preferably on hangers.

A similar system is described in the Italian patent 192241 registered in 1982 in the Applicant's name.

In particular, the bearing element of this type of systems, which also defines the system itinerary, is composed of a tubular rail with preferably square cross-section, whose lower side (that is to say the downward side) continuously features a central longitudinal narrow notch.

The rail co-operates with the element used to pull and support the hangers with the garments, that is to say a metallic belt having the same length as the rail. The intrinsic flexibility allows the belt to follow all sections of the itinerary covered by the rail, including non-linear and non-flat sections.

In particular, the metallic belt is characterised by the presence of a regularly spaced series of openings with a double function: on one hand the openings act as hooking points for the hangers used to hang the garments to be moved, and on the other hand they allow the metallic belt to be pulled forward by suitable motorised sprocket wheels with vertical axis acting in one or more sections of the belt.

This is because the teeth on the perimeter of the sprocket wheels can exactly engage with the openings of the adjacent section of the belt. It appears evident that the rotary motion of the sprocket wheel promotes the forward rectilinear motion of the belt.

In order to be coupled with the bearing tubular rail, the upper longitudinal edge of the belt is provided with regularly spaced multiple pairs of idle wheels with horizontal axis fixed directly to the belt in such a way that the wheels in each pair project, with one wheel on one side of the belt, and the other wheel on the opposite side of the belt.

The space between two pairs of wheels with horizontal axis houses two small idle wheels with vertical axis, one after the other, in eccentric position, since one wheel projects on one side of the belt and the other wheel projects on the opposite side.

This is made possible by the fact that the vertical pin of each wheel is fitted in the centre of the horizontal wing of an L-shaped bracket, whose vertical wing is fitted and laterally fixed to the belt.

The coupling between the belt and the rail occurs because the alternate series of wheels with vertical axis and wheels with horizontal axis exactly engages with the longitudinal cavity of the rail, while the body of the belt in edgeways position moves freely forward in the longitudinal notch on the lower side of the rail.

Once they are housed inside the rail, the wheels of the belt perform specific functions.

The pairs of wheels with horizontal axis, having a diameter slightly lower than the height of the internal cavity of the rail, are mainly designed to support the belt during its forward motion and maintain it at constant height with respect to the rail.

The consecutive pairs of wheels with vertical axis, having a diameter slightly higher than half of the width of the internal cavity of the rail, are designed to favour the curve of the flexible metallic belt and its correct centring with respect to the rail when the belt moves in the non-rectilinear sections of the rail, thanks to the interference with the lateral sides of the rail.

According to the direction of the belt and the curve of the various sections of the system, the interference of the wheels with vertical axis in projecting position on the right-hand side of the belt with the right side of the rail or, alternatively, the interference of the wheels with vertical axis in projecting position on the left-hand side of the belt with the left side of the rail can be determined.

From the functional viewpoint, this technology guarantees very advantageous results and is regularly used in all overhead conveyor systems.

However, the same technology has shown a quite significant drawback, which consists in the tendency of the metallic belt to crack, if not break, especially after prolonged use.

The failure is the consequence of the strong flexural stresses suffered by the belt when the belt moves along a curve in a non-rectilinear section of the rail.

The stresses are especially traumatic because the lateral supporting points on both sides of the belt are located at a great distance.

As mentioned above, the metallic belt features a regular repetitive sequence of three supporting and guiding elements, represented by a pair of opposite wheels with horizontal axis, a wheel with vertical axis in projecting position on the left side and a wheel with vertical axis in projecting position on the right side, respectively.

If we consider, for example, that in a rightward curve the belt is only supported by the wheels in projecting position on the right side, it appears evident that the space between one of the wheels that supports the belt on the right side and the following wheel is higher than the sum of the diameter of the coupled wheels with horizontal axis and the diameter of the wheel with vertical axis in projecting position on the left side of the belt.

Evidently, the stresses also depend on the curving radius of the rail sections. However, the description above clearly shows that the section of metallic belt that moves along a non-rectilinear section of the conveyor system has the configuration of a polygonal broken line, and not the configuration of an harmonious curve. The segments of the broken line are defined by the wheels with vertical axis that rest against the internal vertical face of the rail.

It is worthless saying that the flexural stresses that can crack or break the belt structure occur in the points with highest bending of the belt, that is to say in the lateral supporting points that coincide with the vertexes of the polygonal broken line.

The main purpose of the present invention is to protect the flexible belt with openings used in overhead conveyor systems against flexural stresses.

In order to achieve this purpose, the wheels with horizontal and vertical axis are not fixed directly to the structure of the flexible belt. Being necessary to support and guide the metallic belt, the wheels are fixed to a special bracket, which is fitted in turn astride the upper longitudinal edge of the flexible belt.

The bracket is formed by the co-operation of two identical opposite curved metallic jaws with opposite convex faces, fixed to the flexible belt in their central section.

In particular, the two central sections of the jaws are separated by a short space that basically corresponds to the thickness of the flexible metallic belt, since the bracket composed of the aforementioned jaws must be placed in saddle-like position on the upper edge of the metallic belt.

Evidently, the ending sections of each jaw tend to have an increasing distance from the centre to the periphery with respect to the ending sections of the opposite jaw.

It can be otherwise said that each of the brackets located at each ending section features a sort of "dovetail" with the widest side in the external ending section.

The configuration of the two jaws of the bracket creates an upward projecting eyelet in the central line of the bracket, which is used to insert and fix the pin with horizontal axis of an opposite pair of idle wheels, designed to be placed in projecting position on the right and left side of the belt, respectively.

The jaws provide the bracket with a housing for a pin with vertical axis designed to support an idle wheel having a diameter slightly lower than the width of the rail, approximately at the beginning of each ending section with dovetail configuration.

It must be noted that, because of the bracket, the two pins with vertical axis are supported in different points on the longitudinal symmetric plane of the bracket.

This is especially important, since it allows the two pins with vertical axis to be placed in centred coplanar position with respect to the lower longitudinal edge of the belt, once the bracket has been fixed to the upper longitudinal edge of the flexible belt and until the belt is in perfect rectilinear position.

If we consider that the wheels with vertical axis have a diameter slightly lower than the internal width of the rail, it is clear that each wheel can support and guide the metallic belt in all non-rectilinear sections of the rail, including rightward and leftward sections.

This allows for a significant reduction of the distance between two adjacent supporting points (reference is made to the wheels with vertical axis) of the belt when moving along the curved sections of the system.

According to the new solution of the invention, the two adjacent supporting points of the belt are separated by a distance that is slightly higher than the diameter of the two coupled wheels with horizontal axis that, as mentioned above, are regularly alternated to each wheel with vertical axis.

In any case, the stresses suffered by the pins with vertical axis when travelling along the curvilinear sections of the rail are transmitted to the bracket that is used to support the pins—and not to the flexible belt—and is fixed to the belt in one central point only.

It is clear that the reduction of the distance between adjacent supporting points of the belt allows to significantly soften the curved profile of the belt in non-rectilinear sections of the rail and consequently reduce the harmful flexural stresses that may crack or break the belt.

Moreover, the integrity of the belt is further guaranteed by the opposite pairs of curved jaws that make up the aforementioned brackets.

In fact, when a section of the belt curves because of the non-rectilinear section of the rail, the section can exactly rest against the internal side of one of the curved jaws (the right or left jaw, according to the curve direction) that make up the brackets fixed to the upper longitudinal edge of the belt.

The fact that different sections of the flexible belt can match and rest against the curved profile of the jaws is extremely advantageous, since it forces the sections to follow gentle regular curves, thus favouring a practically uniform distribution of the flexural stresses along the entire section of belt comprised between the supporting points.

For major clarity, the description of the invention continues with reference to the enclosed drawings, which are intended for purposes of illustration only, and not in a limiting sense, whereby:

FIG. 3 is the same as the aforementioned figures, except for the fact that the bracket is fixed to the belt and the wheels are mounted on the bracket;

FIG. 4 is a bottom view of a section of the belt of the invention shown in a curved section of the conveyor system;

FIG. 5 is a cross-section of a section of the belt in curved position with a plane that intersects all openings, such as plane V-V of FIG. 3;

Figure 1:
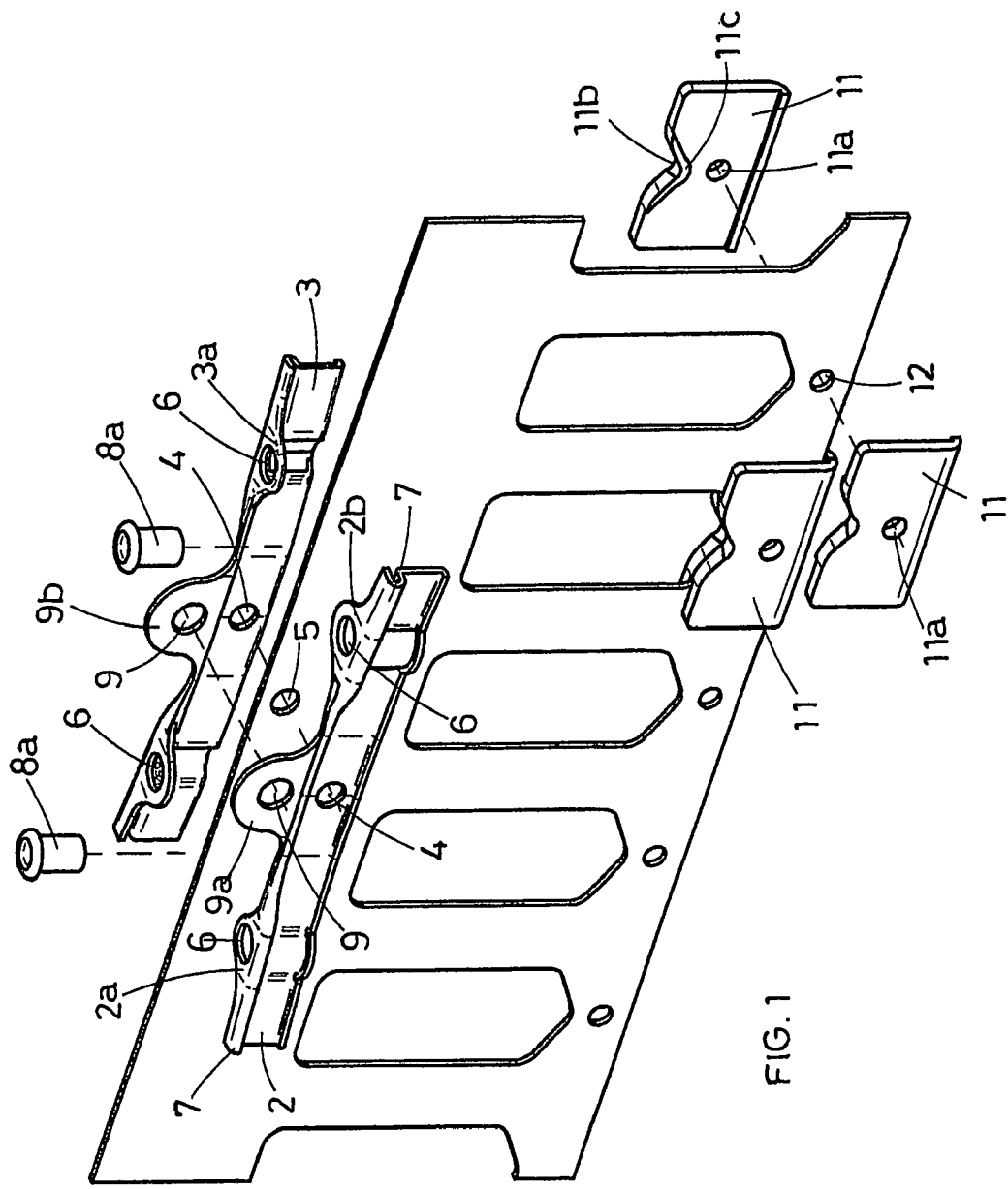
FIG. 1 is an axonometric view of a section of the belt of the invention with an exploded view of the bracket without wheels.

With reference to FIGS. 1 to 5, the flexible metallic bent of the invention (N) is provided with openings (F) designed to favour the motion of the belt and hold the hangers with garments.

The upper longitudinal edge of the belt (N) is characterised by the presence of a sequence of brackets (1) composed of a symmetrically opposite pair of curved metallic jaws (2, 3) suitably fixed one against the other.

In particular, the jaws (2, 3) are fitted in such a way that the central, basically rectilinear section of the first jaw (2) and the central section of the opposite jaw (3) are separated by a distance basically equal to the thickness of the belt (N).

As mentioned above, the brackets (1) are designed to be placed astride the belt (N), preferably by means of a rivet with horizontal axis that goes through two holes (4) of the jaws (2, 3) and one identical intermediate hole (5) of the belt (N).

Each jaw (2, 3) is provided in upper ending position with two shelves (2*a*/2*b*, 3*a*/3*b*) with holes with vertical axis (6) above a deep-drawn vertical stiffening rib (7).

When the two jaws (2, 3) are fixed one against the other, the two shelves (2*a*, 2*b*) of the first jaw (2) exactly overlap with the two shelves (3*a*, 3*b*) of the second jaw (3); consequently, the holes with vertical axis (6) of the two pairs of overlapped shelves (2*a*/3*b*, 2*b*/3*a*) are perfectly aligned and can receive the pins with vertical axis (8*a*) of idle wheels (8).

An eyelet in edgeways position (2*c*, 3*c*) protrudes upwards in the central, basically rectilinear section of each jaw (2, 3).

When the pair of jaws is fixed, the two eyelets (9*a*, 9*b*) of the jaws (2, 3) are placed one against the other, thus causing the perfect alignment of the holes (9) with horizontal axis that can be used to receive the pin with horizontal axis (10*a*) for an opposite pairs of idle wheels (10).

As shown in FIG. 4, all wheels (8) with vertical axis have a diameter slightly lower than the internal width of the boxed rail (R) and the distance between the two wheels with vertical axis (8*a*) of each bracket (1) is basically equal to the diameter of wheels (10*a*) in interposed position.

The same FIG. 4 also shows the position of the belt of the invention (N) in a non-rectilinear section of the boxed rail (R).

As shown in this figure, all wheels with vertical axis (8) in adjacent close position come in contact with the same lateral side of the rail (R), according to the rightward or leftward direction of the curve; additionally, the figure shows that, when curving, the flexible belt (N) exactly rests against the brackets (1) on the jaws (3) on the internal side of the curve.

In the embodiment shown in the aforementioned figures, each of the brackets (1) is obtained by coupling two samples of the same jaw (by simply inverting their direction).

In order to ensure the perfect coupling of two samples of the same jaw, the two shelves (2a/2b, 3a/3b) of the jaw must be located at a slightly different height. In this way, when coupling two samples of the jaw, the shelf with higher height of the first jaw can exactly overlap the opposite shelf with lower height of the second jaw, and vice versa.

It is worthless saying that the exact overlapping of the two pairs of shelves is an essential condition for the exact vertical alignment of the holes (4).

Moreover, the jaw (2 or 3) can be advantageously obtained with die-casting or by shearing and pressbending metal plates.

Figure 2:
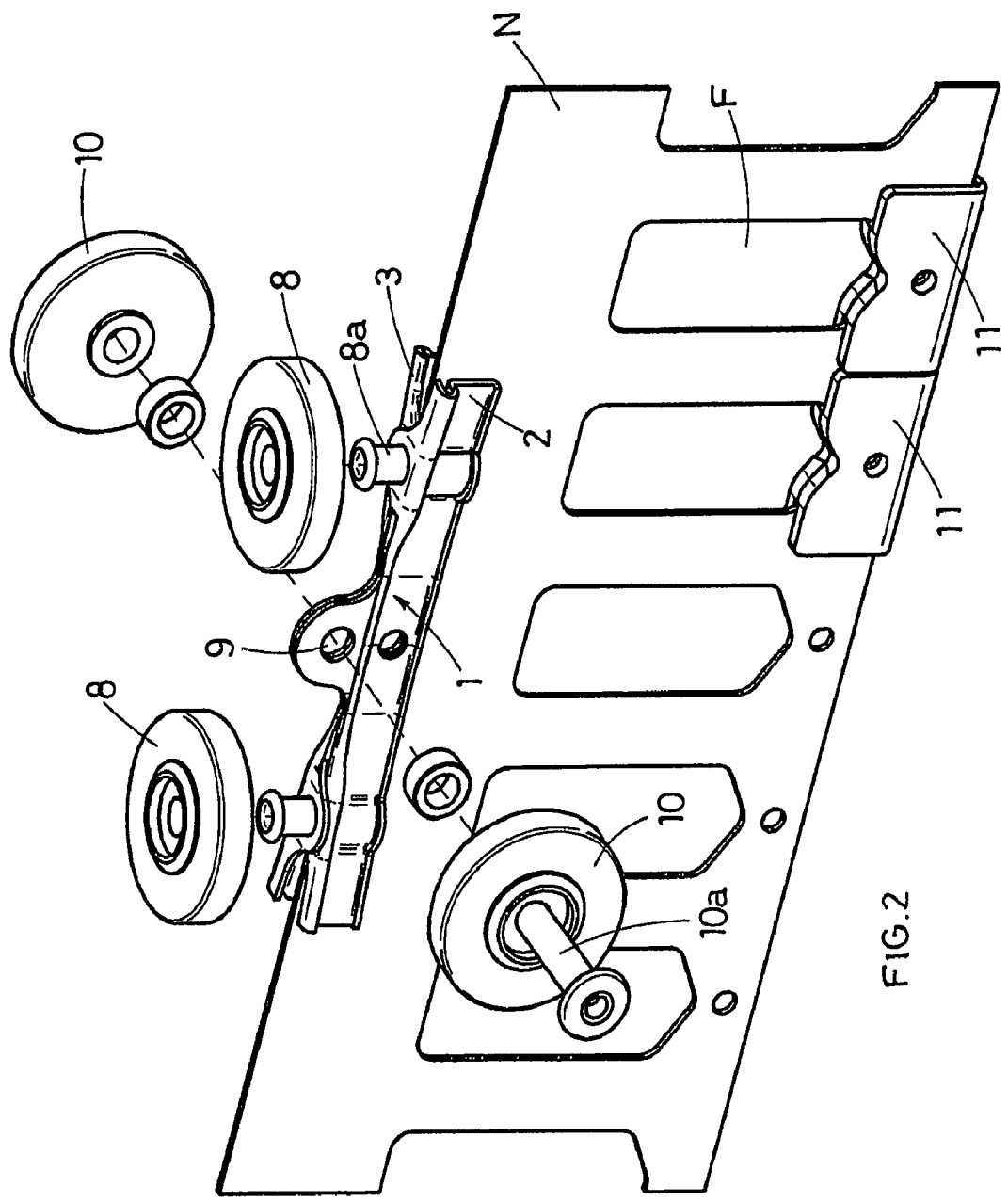
FIG. 2 is the same as FIG. 1, except for the fact that the bracket is fixed to the belt and the wheels are not mounted on the bracket.

In FIGS. 1 to 3, number (11) is used to indicate plates fixed to the lower longitudinal edge of the belt (N), for opposite pairs and in close sequence.

More exactly, each opposite pair of plates (11) is fixed to the base of one of the openings (F) by means of a rivet with horizontal axis inserted in the holes (11a) of the plates (11) and in the hole (12) of the belt (N) under the opening (F).

Each plate (11) has an upper V-shaped edge (11b) that exactly matches the profile of the lower edge of the opening (F).

Additionally, each plate (11) has internal sides with convex profile (11c) designed to condition the harmonious regular curving of the lower edge of the belt (N), in co-operation with the other plates (11) of the sequence, when the belt (N) travels along non-rectilinear sections of the rail (R), as shown in FIG. 5.

Figure 6:
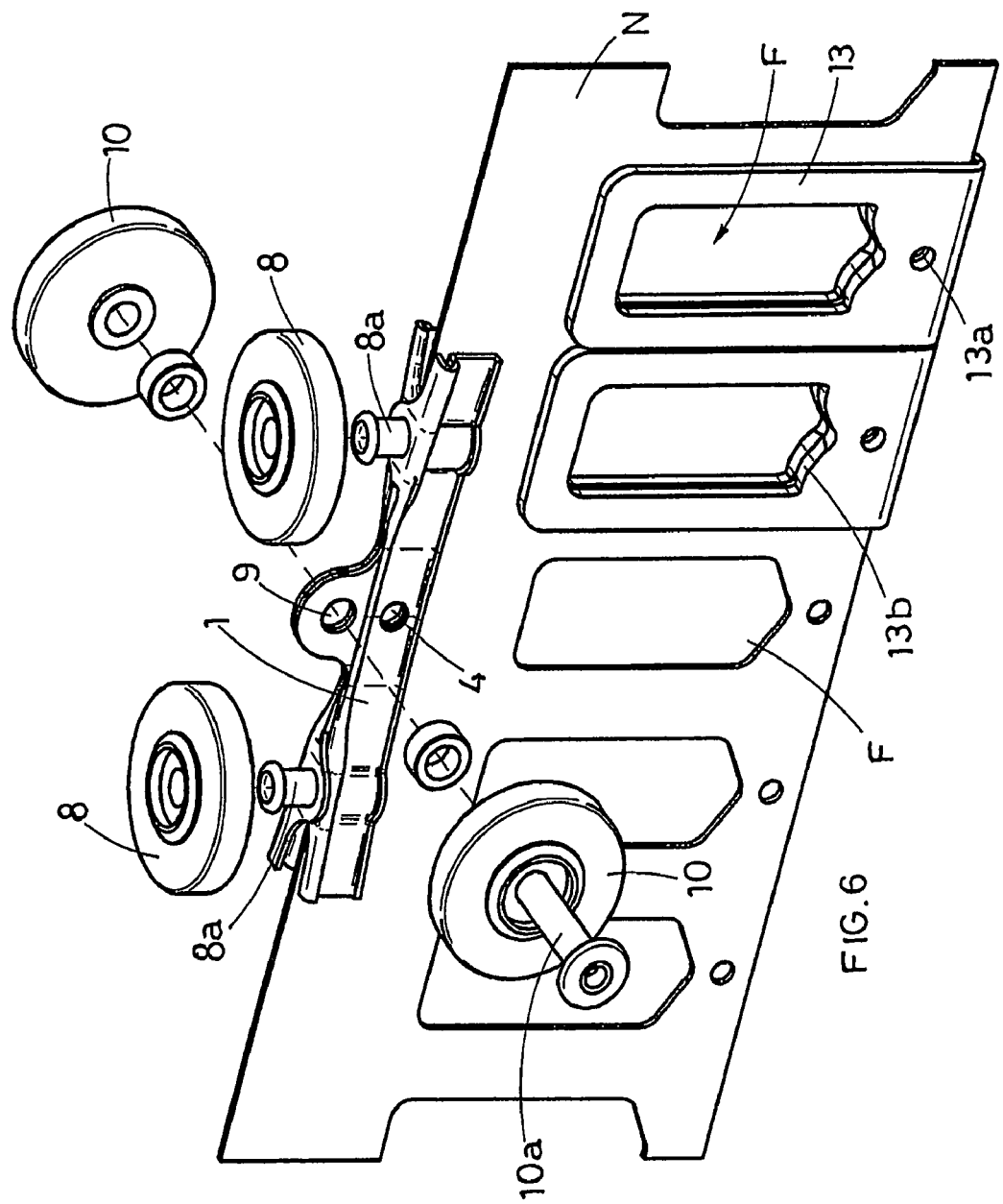
FIG. 6 is the same as FIG. 2, except for the fact that it refers to an alternative embodiment of the invention.

The embodiment of the invention shown in FIG. 6 makes use of a non-metallic belt (N) made for example of rubber, like transmission belts, instead of the metallic belt (N).

The possibility to use a non-metallic belt (N) is the direct consequence of the presence of the brackets (1) that support the wheels (8, 10); it is clear that a soft rubber belt could not withstand the direct application of the wheels on the upper edge of the belt.

However, the non-metallic belt (N) may not ensure the effective grip of the teeth of the sprocket wheels used to move the belt.

To that end, the non-metallic belt (N) is provided with opposite pairs of special plates (13) with eyelet that, apart from having the usual convex profile on the internal sides, exactly frame the openings (F) of the belt (N).

It is clear that the teeth of the sprocket wheels used to pull the belt (N) can effectively grip the internal vertical edges of the eyelets of the plates (13).

Figure 7:
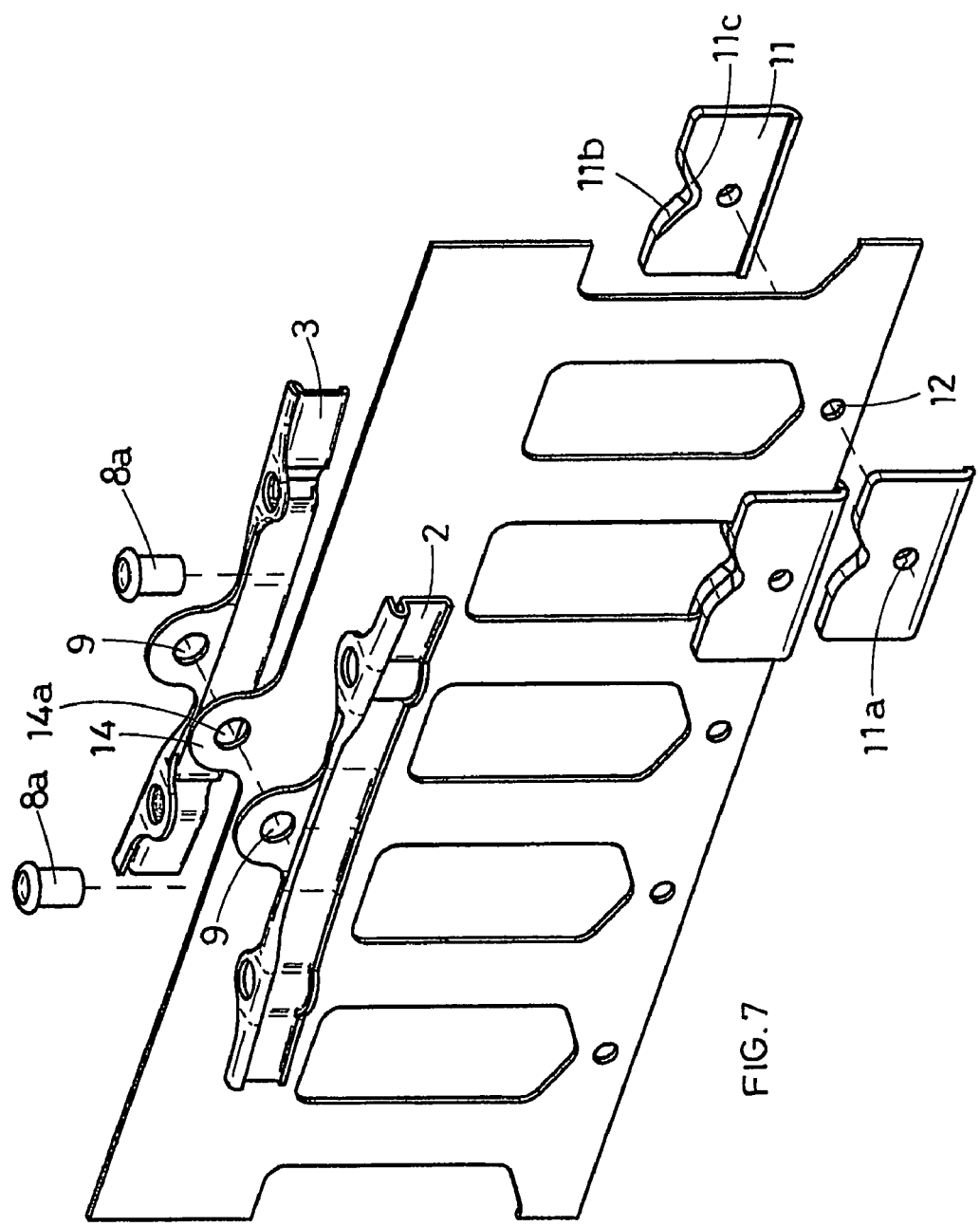
FIG. 7 is the same as FIG. 1, except for the fact that it refers to another alternative embodiment of the invention.

The embodiment of the invention shown in FIG. 7 is the same as the one shown in FIGS. 1 to 3, except for the fact that the upper longitudinal edge of the belt (N) has a series of regularly spaced eyelets (14) having exactly the same shape as the eyelets (2c, 3c) of the jaws (2, 3).

In this way, when an opposite pair of jaws (2, 3) is tightened against the belt (N), the holes of the eyelets (2c, 3c) and the hole (14a) of the eyelets (14) of the belt (N) are perfectly aligned and can receive and fit the pin with horizontal axis (10a) that supports the wheels (10).

In this case the pin (10a) also acts as connection element between the belt (N) and the jaws (2, 3) of each bracket (1), thus eliminating the holes (4, 5) of the jaws (2, 3) and the belt (N) of the embodiment of the invention shown in FIGS. 1 to 3.

The invention claimed is:

1. Belt for overhead conveyor systems, provided with regularly spaced openings, the belt comprising a close series of identical brackets (1) fixed to the upper longitudinal edge of the belt, each bracket being composed of an opposite pair of identical curved jaws (2, 3) and designed to support an opposite pair of wheels (10) with horizontal axis in central position and a single wheel (8) with vertical axis at each end.

2. Belt as defined in claim 1, characterised by the fact that each jaw (2, 3) is provided in upper ending position with shelves (2a/2b, 3a/3b) with holes with vertical axis (6) used to fit the pins (8a) of the wheels (8) and characterised by the fact that each jaw (2, 3) has a central eyelet (2c, 3c) in edgeways position suitable to receive the horizontal pin (10a) that supports the opposite pair of wheels (10).

3. Belt as defined in claim 1 or in both preceding claims, characterised by the fact that each jaw (2, 3) has a central hole (4) that receives a rivet used to fix each bracket (1) to the belt (N) with a hole (5).

4. Belt as defined in one or more of the preceding claims, characterised by the fact that it has a close series of opposite pairs of plates (11) fixed to the lower longitudinal edge, each of them having an internal convex face (11c) and a V-shaped upper edge (11b), as well as a hole (11a) that receives a rivet used to fix each pair of plates (11) to the belt (N) with a hole (12).

5. Belt as defined in one or more claims 1 to 3, characterised by the fact that it has a close series of opposite pairs of plates (13) with eyelets fixed to the lower longitudinal edge, each of them having an internal convex face (13c) and a V-shaped internal horizontal edge (13b), as well as a hole (13a) that receives a rivet used to fix each pair of plates (13) to the belt (N) with a hole (12).

6. Belt as defined in one or more of the preceding claims, characterised by the fact that the upper longitudinal edge has a regularly spaced series of eyelets (14) having exactly the same shape as the eyelets (2c, 3c) of the jaws (2, 3), as well as a central coaxial hole (14a) identical to the holes (9) of the eyelets (2c, 3c).

7. Belt as defined in one or more of the preceding claims, characterised by the fact that it has a metallic structure.

8. Belt as defined in one or more of claims 1 to 6, characterised by the fact that it has a non-metallic structure.

9. Belt as defined in the preceding claim, characterised by the fact that it is made of rubber.

* * * * *